United States Patent
Finamore

(10) Patent No.: US 7,323,043 B2
(45) Date of Patent: Jan. 29, 2008

(54) STORAGE CONTAINER ASSOCIATED WITH A THERMAL ENERGY MANAGEMENT SYSTEM

(75) Inventor: Peter Finamore, Weddington, NC (US)

(73) Assignee: Deere & Company, Moline, IL (US)

( * ) Notice: Subject to any disclaimer, the term of this patent is extended or adjusted under 35 U.S.C. 154(b) by 368 days.

(21) Appl. No.: 11/177,858

(22) Filed: Jul. 8, 2005

(65) Prior Publication Data
US 2005/0268647 A1    Dec. 8, 2005

Related U.S. Application Data

(63) Continuation-in-part of application No. 10/628,221, filed on Jul. 28, 2003, now Pat. No. 6,969,545.

(51) Int. Cl.
*F17C 11/00* (2006.01)

(52) U.S. Cl. .......................... 96/146; 206/0.7

(58) Field of Classification Search ............... 96/108, 96/146; 206/0.7; 423/248, 648.1; 420/900; 429/13; 502/526
See application file for complete search history.

(56) References Cited

U.S. PATENT DOCUMENTS

| | | | |
|---|---|---|---|
| 4,318,890 A | | 3/1982 | Monahan |
| 4,819,718 A * | | 4/1989 | Ishikawa et al. ........ 165/104.12 |
| 5,082,048 A | | 1/1992 | Iwaki et al. |
| 5,445,099 A * | | 8/1995 | Rendina ..................... 114/140 |
| 6,033,506 A | | 3/2000 | Klett .......................... 156/78 |
| 6,037,032 A | | 3/2000 | Klett et al. ................... 428/71 |
| 6,195,999 B1 | | 3/2001 | Arnold et al. ................ 60/649 |
| 6,261,485 B1 | | 7/2001 | Klett ........................ 264/29.6 |
| 6,287,375 B1 | | 9/2001 | Klett .......................... 106/122 |
| 6,344,159 B1 | | 2/2002 | Klett ........................ 264/29.7 |
| 6,387,343 B1 | | 5/2002 | Klett .......................... 423/448 |
| 6,398,994 B1 | | 6/2002 | Klett ........................... 264/42 |
| 6,399,149 B1 | | 6/2002 | Klett et al. ................. 427/230 |
| 6,425,251 B2 | | 7/2002 | Stetson et al. |
| 6,430,935 B1 | | 8/2002 | Klett et al. |
| 6,432,379 B1 * | | 8/2002 | Heung ..................... 423/648.1 |
| 6,598,624 B2 | | 7/2003 | Togasawa et al. ............. 141/1 |
| 6,627,148 B1 | | 9/2003 | Ovshinsky et al. |
| 6,638,348 B2 * | | 10/2003 | Kuriiwa et al. ............... 96/146 |
| 6,860,923 B2 | | 3/2005 | Myasnikov et al. .......... 96/146 |

(Continued)

FOREIGN PATENT DOCUMENTS

EP    1 115 169 A2    7/2001

(Continued)

*Primary Examiner*—Frank M. Lawrence

(57) ABSTRACT

A container for storing hydrogen comprises an outer shell having an inlet for inputting hydrogen gas and an outlet for outputting hydrogen gas. A thermally conductive liner lines an interior of the outer shell. An inner hydride core is in communication with the inlet and the outlet for storing the hydrogen gas. Coolant lines are in thermal communication with the storage container. A thermal management controller determines whether the container is in a dispensing mode or a refueling mode. If the container is in the dispensing mode, the coolant lines may be routed to a first heat exchanger that is in thermal communication with a propulsion unit of a vehicle. However, if the container is in the refueling mode, the coolant lines may be routed to a second heat exchanger associated with a temperature that is less than or equal to the ambient temperature outside of the vehicle.

15 Claims, 7 Drawing Sheets

U.S. PATENT DOCUMENTS

| | | |
|---|---|---|
| 6,887,604 B2 | 5/2005 | Suzuki et al. ................ 429/20 |
| 7,112,239 B2 * | 9/2006 | Kimbara et al. .............. 96/108 |
| 7,115,159 B2 * | 10/2006 | Fujita et al. ................. 96/108 |
| 2003/0042008 A1 | 3/2003 | Schulz et al. |
| 2004/0031591 A1 | 2/2004 | Myasnikov et al. ... 165/104.12 |
| 2004/0035401 A1 | 2/2004 | Ramachandran et al. ... 123/527 |
| 2004/0251007 A1 | 12/2004 | Toh et al. |
| 2005/0013770 A1 | 1/2005 | Schulz et al. |
| 2006/0051638 A1 | 3/2006 | Gross |

FOREIGN PATENT DOCUMENTS

| | | |
|---|---|---|
| EP | 1 331 289 A1 | 7/2003 |
| JP | 2000088196 A | 3/2000 |
| JP | 2001355795 A2 | 12/2001 |

* cited by examiner

US 7,323,043 B2

STORAGE CONTAINER ASSOCIATED WITH A THERMAL ENERGY MANAGEMENT SYSTEM

This is a continuation-in-part of U.S. application Ser. No. 10/628,221, filed Jul. 28, 2003 now U.S. Pat. No. 6,969,545, and entitled HYDROGEN STORAGE CONTAINER.

FIELD OF THE INVENTION

This invention relates to a storage container associated with a thermal energy management system.

BACKGROUND OF THE INVENTION

Gaseous fuels may be stored in metallic or polymeric tanks. Gaseous fuels include hydrogen, methane, propane, ether, natural gas, acetylene, and other flammable gases or mixtures thereof. The storage capacity of a tank may be based upon the burst strength and maximum safe operating pressure of the tank over a defined ambient temperature range. To increase the storage capacity of a tank, hydrogen may be stored as a hydride. Hydride is a binary compound of hydrogen, usually formed with a more electropositive element. When a storage tank is filled with hydrogen, the hydrogen may be converted to a hydride. The hydride material expands during the filling with hydrogen gas and contracts during the release of the hydrogen gas. Accordingly, the life of the tank may be shortened by fatigue cracks from the foregoing expansion-contraction cycle.

SUMMARY OF THE INVENTION

A container for storing hydrogen comprises an outer shell having an inlet for inputting hydrogen gas and an outlet for outputting hydrogen gas. A thermally conductive liner lines an interior of the outer shell. An inner hydride core is in communication with the inlet and the outlet for storing the hydrogen gas. Coolant lines are in thermal communication with the storage container. A thermal management controller determines whether the container is in a dispensing mode or a refueling mode. If the container is in the dispensing mode, the coolant lines may be routed to a first heat exchanger that is in thermal communication with a propulsion unit of a vehicle. However, if the container is in the refueling mode, the coolant lines may be routed to a second heat exchanger associated with a temperature that is less than or equal to the ambient temperature outside of the vehicle.

DESCRIPTION OF THE PREFERRED EMBODIMENT

Figure 1:
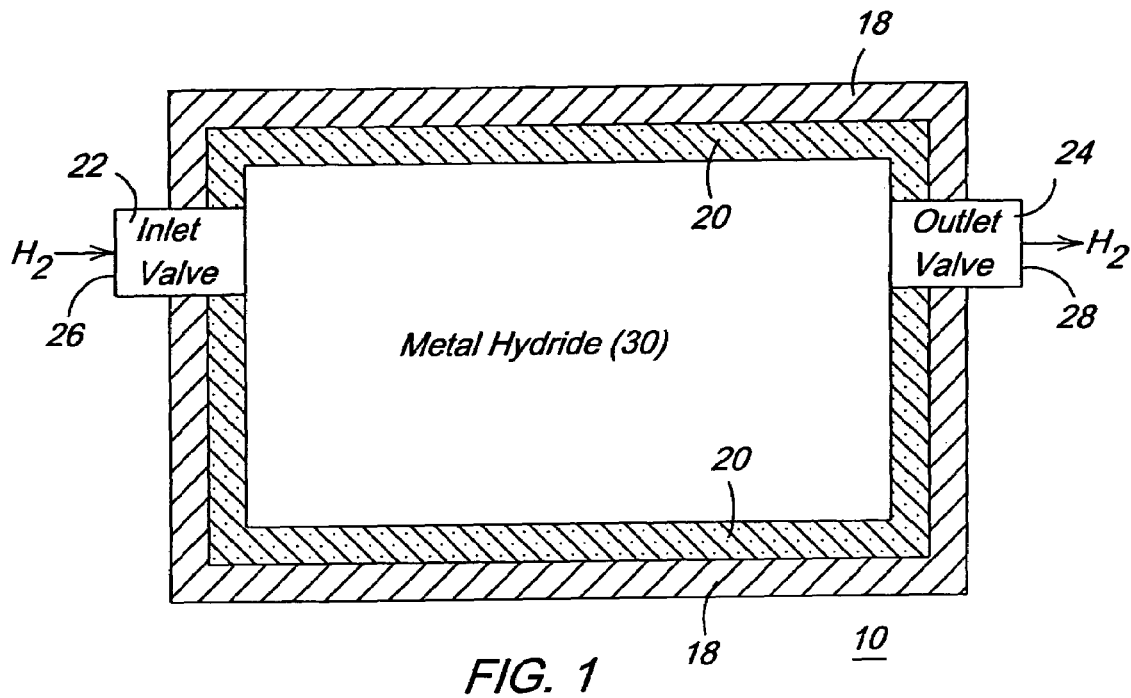
FIG. 1 shows a cross section of a first embodiment of a storage container in accordance with the invention.

FIG. 1 illustrates a first embodiment of a container 10 for storing a gaseous fuel, such as hydrogen. The container 10 comprises an outer shell 18 having an inlet 26 for inputting hydrogen gas and an outlet 28 for outputting hydrogen gas. An inlet valve 22 is associated with the inlet 26 for controlling the input of gas into the container. An outlet valve 24 is associated with the outlet 28 for controlling the exit of gas from the container. The outlet valve 24 may comprise a pressure regulator for regulating or metering the flow of gas exiting from the container 10. A thermally conductive liner 20 lines an interior of the outer shell 18. An inner hydride core 30 is in communication with the inlet 26 and the outlet 28 for storing the hydrogen gas.

Hydride is a binary compound of hydrogen, usually formed with a more electropositive element, such as a metal. The combination of the thermally conductive liner 20 and the inner hydride core 30 may form a storage system for gaseous fuel that is durable, resistant to fatigue, and supports rapid heat transfer in and out of the storage system.

The thermally conductive liner 20 may be configured in accordance with various alternate techniques. Under a first technique, the thermally conductive liner 20 comprises a carbon foam core. The carbon foam has a desired level of heat transfer and is generally non-rigid. Carbon foam may be composed of a carbon-fiber precursor or carbon-graphite that forms a cellular matrix. The carbon foam may have spatial pockets that are capable of storing gas. Carbon foam is generally chemically inert and may be configured for high thermal conductivity. The compressive strength of carbon foam may be less than the burst strength of the container 10, such that the carbon foam liner 20 gives or allows some compression of the carbon foam upon exposure to the storage of higher pressure gas.

Under a second technique, the thermally conductive liner 20 comprises a carbon foam material that generally conforms to a shape of the metallic shell. Under a third technique, the thermally conductive liner 20 comprises a carbon foam coating that coats an interior of the outer shell 18. Under a fourth technique, the thermally conductive liner 20 comprises a graphite foam having a desired high thermal conductivity.

The thermally conductive liner 20 protects the outer shell (e.g., metallic outer shell 18) from hydride expansion during recharging of the container or tank with pressurized hydrogen gas. The thermally conductive liner 20 transfers heat from the hydrogen gas during filling or recharging or compressing of hydrogen gas within the container or tank to improve the ability to fully charge the tank and improve the accuracy of fuel readings.

In one embodiment, the outer shell 18 is constructed of a metallic material selected from the group consisting of steel, aluminum, a steel alloy, and an aluminum alloy.

Figure 2:
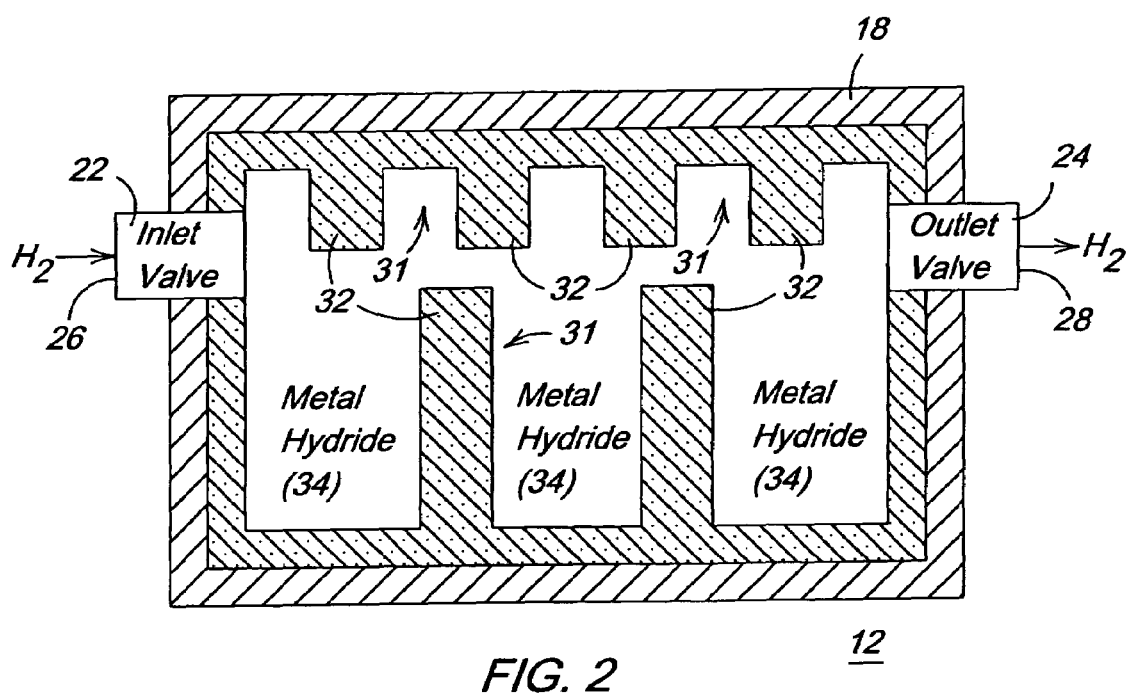
FIG. 2 shows a cross section of a second embodiment of a storage container in accordance with the invention.

FIG. 2 illustrates a second embodiment of the container 12. The container 12 of FIG. 2 is similar to the container 10 of FIG. 1 except the container 12 of FIG. 2 includes a thermally conductive liner 31. In one embodiment, the thermally conductive liner 31 comprises a carbon foam material with a series of fins 32 interspersed with the inner hydride core 34 to enhance thermal transfer of thermal energy between the inner hydride core 34 and the ambient environment around the container 12.

Figure 3:
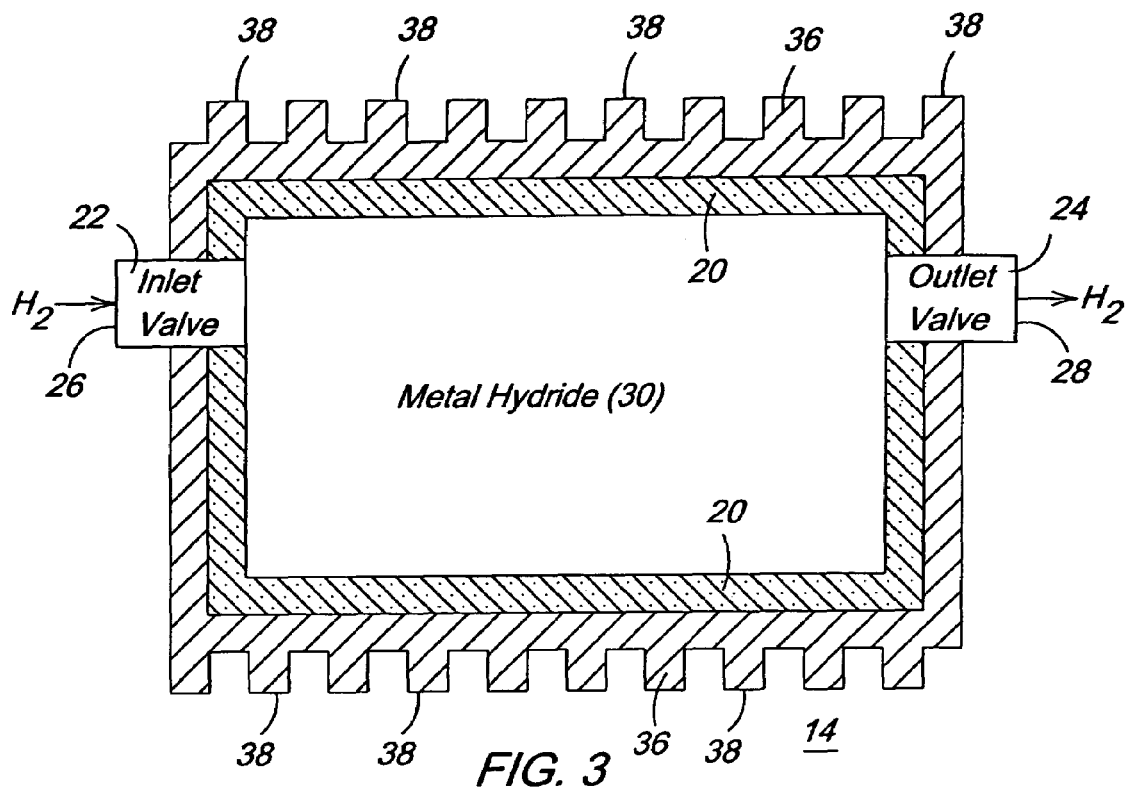
FIG. 3 shows a cross section of a third embodiment of a storage container having external fins for improved heat dissipation.

FIG. 3 illustrates a third embodiment of the container 14. The container 14 of FIG. 3 is similar to the container 10 of FIG. 1 except the container 14 of FIG. 3 further includes external fins 38 on the container 14 to enhance heat transfer from the container 14 to the ambient environment, where the ambient environment is cooler than the container. The external fins 38 may be integrated to the outer shell 36 of the container. Although the container 14 is air-cooled as shown, in an alternate embodiment the container may be water-cooled or liquid-cooled by surrounding the tank with tubing or channels for conducting a coolant.

Figure 4:
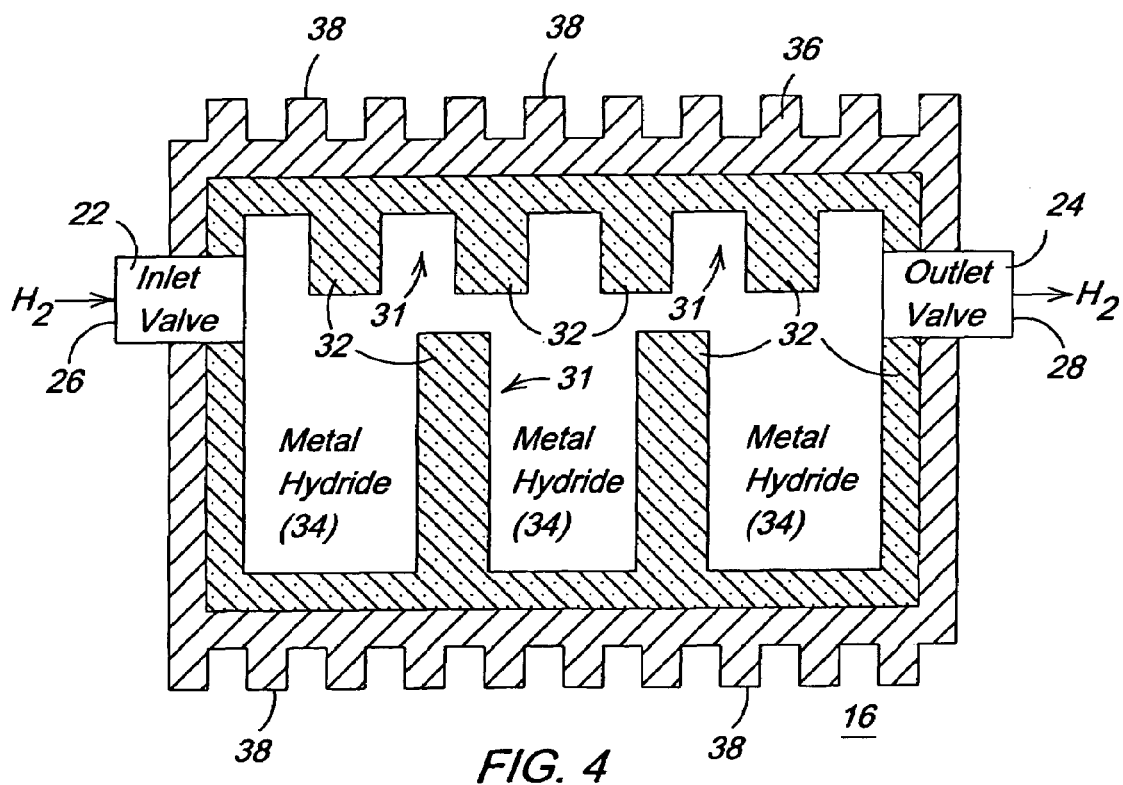
FIG. 4 shows a cross section of a fourth embodiment of a storage container having external fins for improved heat dissipation.

FIG. 4 illustrates a fourth embodiment of the container 16. The container 16 of FIG. 4 is similar to the container 12 of FIG. 2 except the container 16 of FIG. 4 further includes external fins 38 on the container 16 to enhance heat transfer from the container 16 to the ambient environment, where the ambient environment is cooler than the container. The external fins 38 may be integral to the outer shell 36 of the container. Although the container 16 is air-cooled as shown, in an alternate embodiment the container may be water-cooled or liquid-cooled by surrounding the tank with tubing or channels for conducting a coolant.

Any of the embodiments of the containers (10, 12, 14 or 16) described herein or variations thereof may be applied or incorporated into a vehicle. For example, the container may comprise a fuel tank of a hydrogen-powered vehicle selected from the group consisting of a fuel-cell vehicle and an internal combustion engine vehicle.

Figure 5:
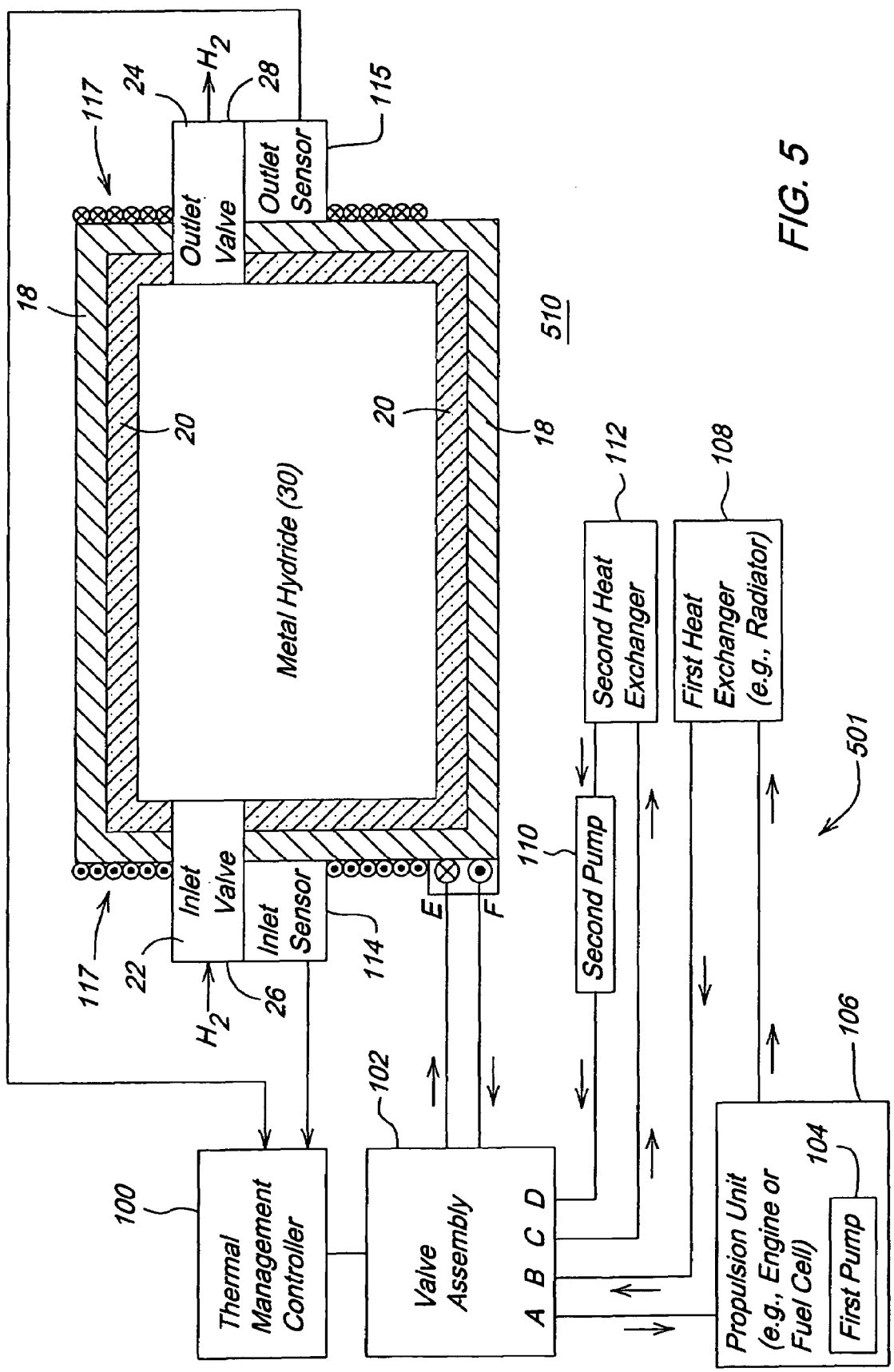
FIG. 5 shows a cross section of one embodiment of the storage container associated with a thermal energy management system.

FIG. 5 is a block diagram of one embodiment of a storage container 510 associated with an energy management system. The storage container 510 of FIG. 5 is similar to the storage container 10 of FIG. 1, except that storage container 510 further comprises an inlet flow sensor 114, an outlet flow sensor 115, and coolant lines 117. Like reference numbers indicate like elements in FIG. 1 and FIG. 5.

The coolant lines 117 are in thermal communication with at least one of the outer shell 18 and the thermally conductive liner 20 of the storage tank. The thermally conductive layer 20 may comprise a carbon foam material or graphite foam material. Although the coolant lines 117 are routed along an exterior of the outer shell 18 in FIG. 5, other configurations of the coolant lines 117 relative to the interior and exterior of the storage tank are possible.

The flow of the coolant during operation of the vehicle or storage tank is illustrated by the symbols in the cross-section of the coolant lines 117. Coolant that flows into coolant lines 117 is indicated by "X's." in FIG. 5. Coolant that flows out of the cross section of the coolant lines 117, is indicated by "dots."

An inlet flow sensor 114 and an outlet flow sensor 115 are associated with the inlet 26 and the outlet 28, or the inlet valve 22 and the outlet valve 24. The inlet flow sensor 114 and the outlet flow sensor 115 communicate a signal or data message with a thermal management controller 100. In turn, the thermal management controller 100 controls the flow of coolant or other fluid through valve assembly 102. The valve assembly 102 may route the coolant or fluid to one or more of the following components: a propulsion unit 106, a first pump 104, a second pump 110, a first heat exchanger 108 and a second heat exchanger 112.

In one configuration, the valve assembly 12, or other lines or piping may statically interconnect the propulsion unit 106 to the first heat exchanger 108 during both the dispensing mode and the refueling mode.

In one embodiment, an inlet flow sensor 114 detects whether hydrogen or gaseous fuel is flowing into the fuel tank through the inlet or inlet valve that meets or exceeds a minimum threshold. If the inlet flow sensor 114 detects the inbound flow of fuel into the storage tank, the inlet flow sensor 114 may generate or transmit a signal or data message. The inbound flow may need to exceed a minimum threshold to be material. Similarly, an outlet flow sensor 115 detects whether hydrogen or gaseous fuel is flowing out of the fuel tank through the outlet or the outlet valve or pressure regulator. The outbound flow may need to exceed a minimum threshold (e.g., that fuel that is required for idling of the propulsion unit 106). The hydrogen or gaseous fuel may be used to power a propulsion unit 106. If the outlet flow sensor 115 detects the outbound flow of fuel from the storage tank, the outlet flow sensor 115 may generate or transmit a signal or data message.

The thermal management system 501 receives or interprets signals or data messages from the inlet flow sensor 114, the outlet flow sensor 115, or both. The thermal management controller 100 determines whether the container 510 is in a dispensing mode or a refueling mode based on the signal associated with at least one of the inlet flow sensor 114 and the outlet flow sensor 115.

A valve assembly 102 routes the coolant lines 117 in a dispensing mode to a first heat exchanger 108 that is in thermal communication with a propulsion unit 106 of a vehicle and for routing the coolant lines 117 in refueling mode to a second heat exchanger 112 associated with a temperature that is less than or equal to the ambient temperature outside of the vehicle. The valve assembly 102 may comprise electro-hydraulic valves, electro-mechanical valves, servo-valves, or flow metering devices controllable by control signals or control data messages generated by the thermal management controller 100.

In one embodiment, the propulsion unit 106 may comprise an internal combustion engine associated with a coolant jacket and a first pump 104. The first pump 104 facilitates the circulation of coolant within the propulsion unit 106 and the first heat exchanger 108. The coolant jacket is generally coupled in series with the first heat exchanger 108. In another embodiment, the propulsion unit 106 comprises a fuel cell associated with a coolant chamber and a first pump 104 for circulating coolant; the coolant chamber coupled in series with the first heat exchanger 108.

The second heat exchanger 112 is associated with a second pump 110 for circulating coolant between the second heat exchanger 112 and the coolant lines 117. The valve assembly 102 may be associated with multiple ports for connection to fluid lines. Here, in FIG. 5, the ports are labeled A, B, C, D, E and F. During the dispensing mode, port A is connected to port F; port B is connected to port E, and ports C and D are not connected to the other ports. During the refueling mode, port A is connected to port B; port D is connected to port E; and Port C is connected to port F.

Figure 6:
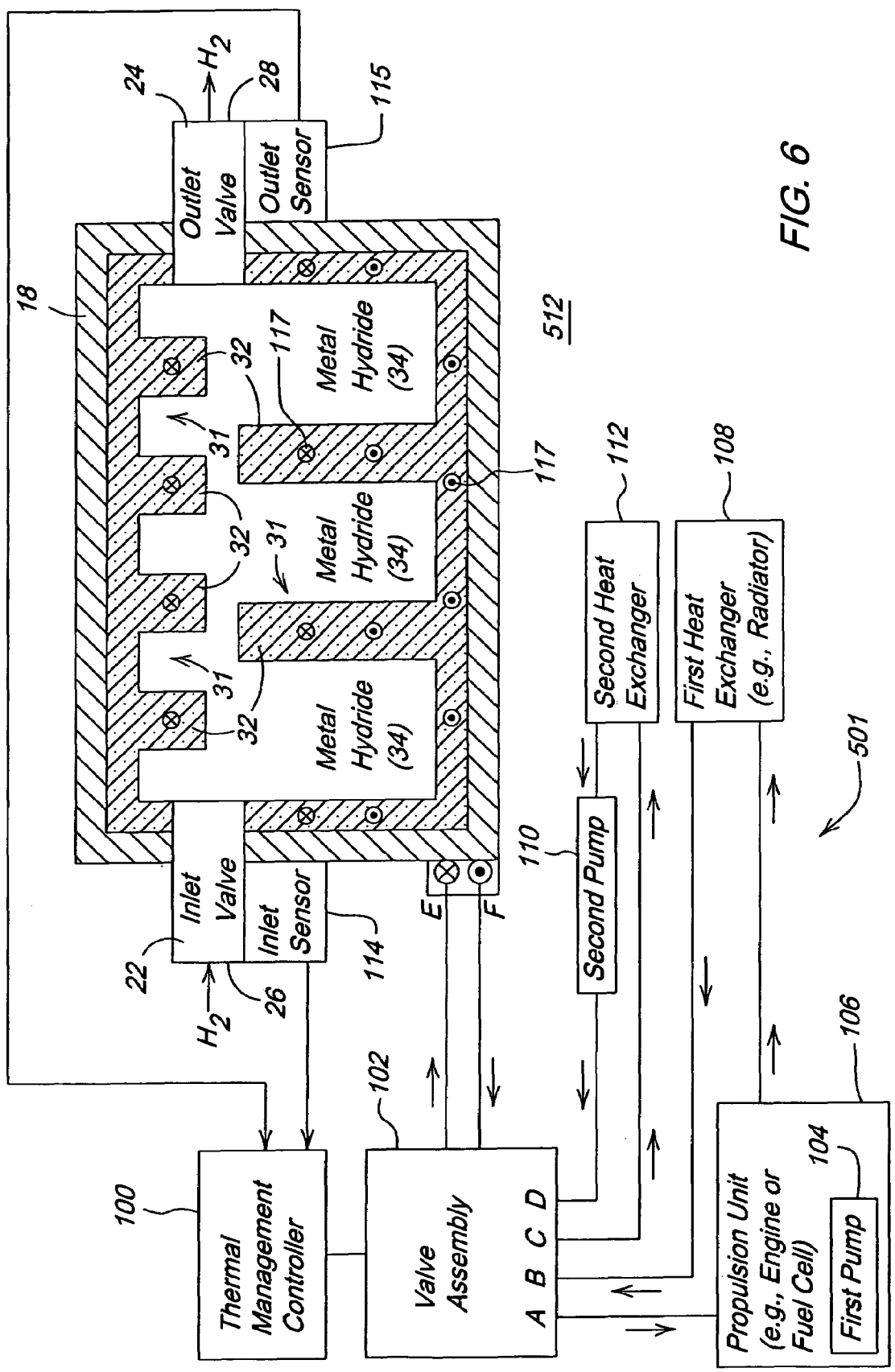
FIG. 6 shows a cross section of another embodiment of a storage container associated with a thermal energy management system.

The storage container 512 of FIG. 6. is similar to the storage container 12 of FIG. 2 except the storage container of FIG. 6 has coolant lines 117 running through or embedded in the thermally conductive liner 31. Like reference numbers in FIG. 2 and FIG. 5 indicate like elements.

The thermally conductive liner 31 has fins 32 and the coolant lines 117 may run through or be embedded in the fins 32. The thermally conductive liner 31 comprises a carbon foam material with a series of fins 32 interspersed with the inner hydride core to enhance thermal transfer of thermal energy between the hydride and the ambient environment around the container. Elastomeric, hermetically welded joints, or high pressure seals may be needed where the coolant lines 117 enter the interior of the tank 512 from the exterior. Coolant that flows into coolant lines 117 is indicated by "X's." in FIG. 6. Coolant that flows out of the cross section of the coolant lines 117, is indicated by "dots."

Figure 7:
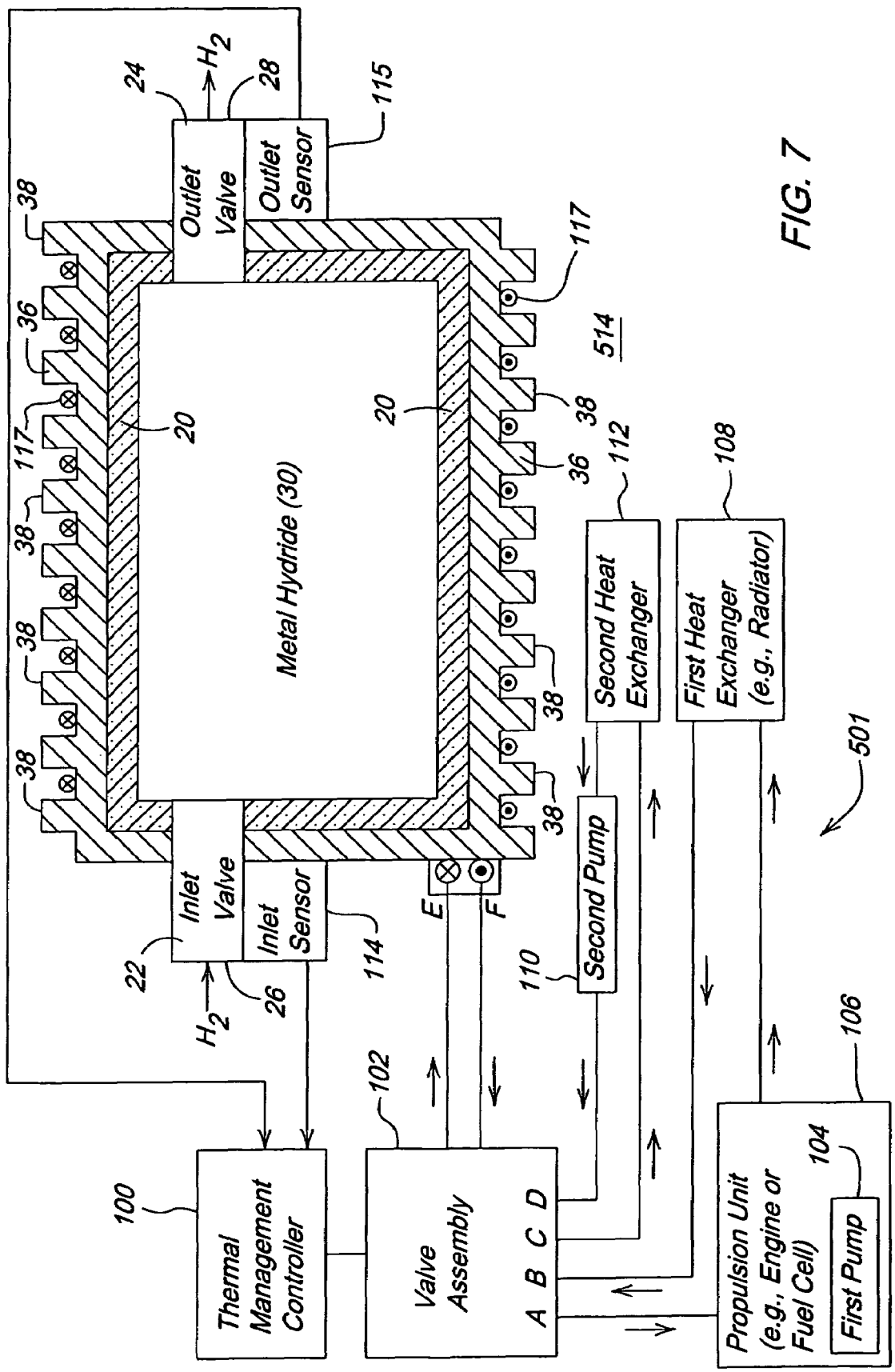
FIG. 7 shows a cross section of yet another embodiment of a storage container associated with a thermal energy management system.

The storage container of FIG. 7 is similar to the storage container 14 of FIG. 3 except that the storage container of FIG. 7 has coolant lines 117 positioned in generally parallel channels formed by external fins 38 on the exterior of the storage container. The coolant lines 117 of FIG. 7 are in thermal communication with the thermally conductive liner 20 via the outer shell 36. In FIG. 7, the coolant lines 117 do not run through the outer shell 36. Coolant that flows into coolant lines 117 is indicated by "X's." in FIG. 7. Coolant that flows out of the cross section of the coolant lines 117, is indicated by "dots."

Figure 8:
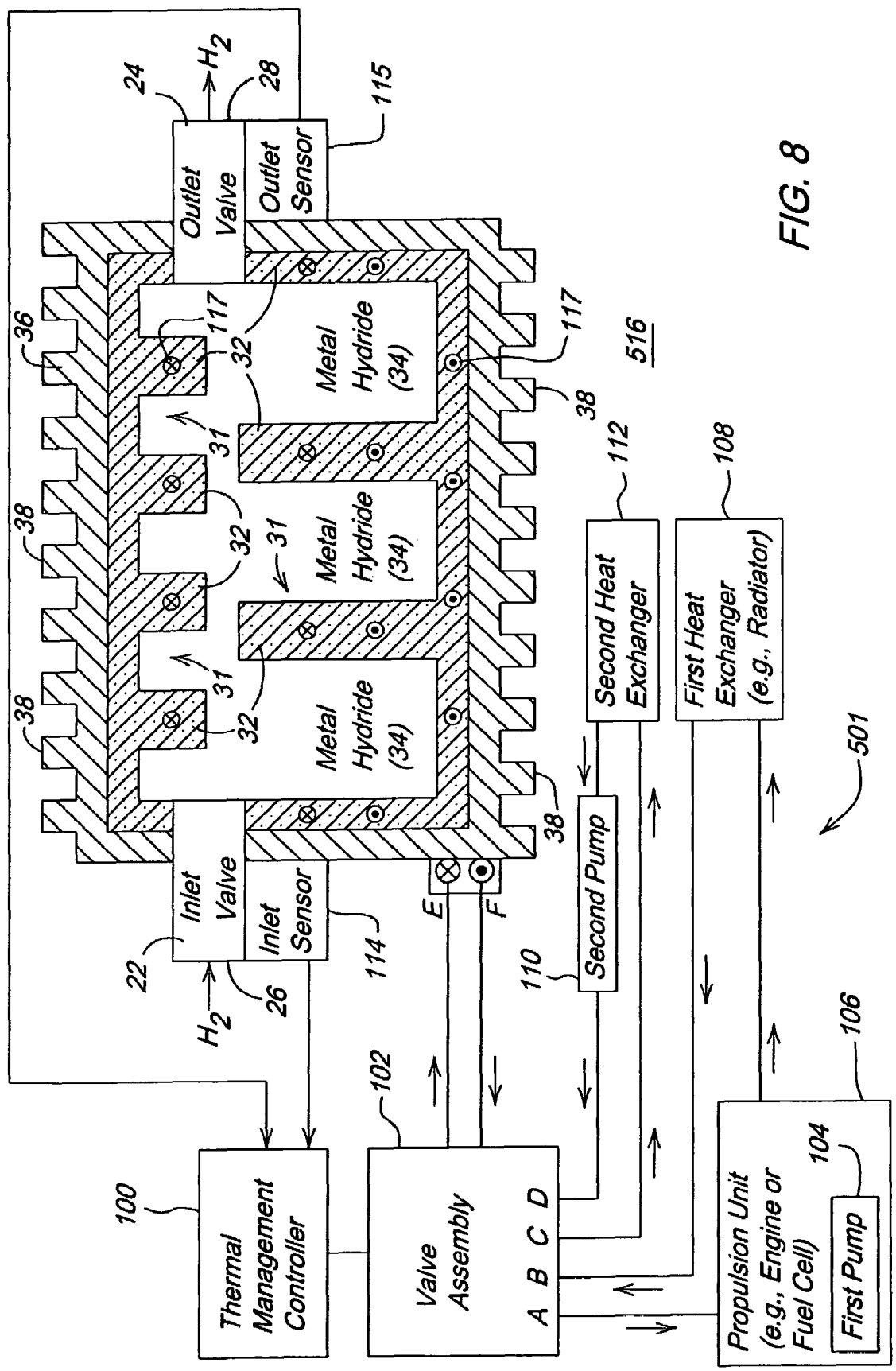
FIG. 8 shows a cross section of still another embodiment of a storage container associated with a thermal energy management system.

The storage container of FIG. 8 is similar to the storage container 16 of FIG. 4 except that the storage container of FIG. 8 has coolant lines 117 running through or embedded in the thermally conductive liner 20. The outer shell 36 comprises external fins 38 for promoting heat dissipation from the container 516 during recharging of the container. Elastomeric, hermetically welded joints, or high pressure seals may be needed where the coolant lines 117 interface with the outer shell 36 or enter the interior of the tank from the exterior. Coolant that flows into coolant lines 117 is indicated by "X's." in FIG. 8. Coolant that flows out of the cross section of the coolant lines 117, is indicated by "dots."

Figure 9:
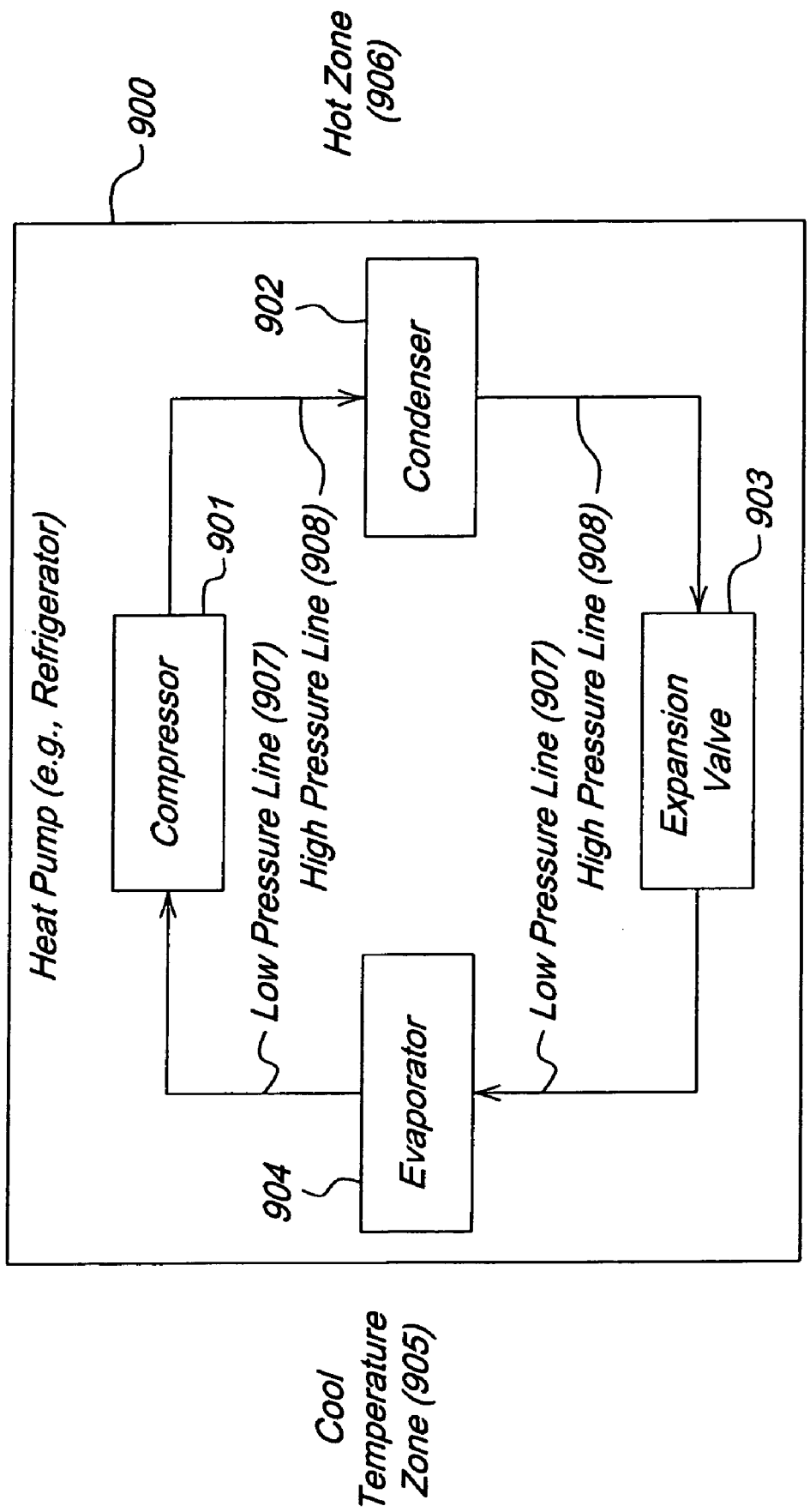
FIG. 9 shows a block diagram of a heat pump (e.g., refrigerator) which may be used in conjunction with any embodiment in FIG. 5 through FIG. 8, inclusive.

FIG. 9 shows a block diagram of a heat pump 900 (e.g., refrigerator) which may be used in conjunction with any embodiment in FIG. 5 through FIG. 8, inclusive.

The heat pump 900 (e.g., refrigerator) comprises a compressor 901 for compressing a refrigerant (e.g., ammonia, Freon, or otherwise). The compressor 901 moves the refrigerant from a low pressure side to a high pressure side of the heat pump 900. The compressor 901 may be driven by the propulsion unit 106 via a belt, a chain, a gear system, or otherwise. Alternatively, the compressor 901 may be driven by an electric motor attached thereto. If the inlet flow sensor 114 detects the flow of hydrogen gas into the container that meets or exceeds a minimum threshold or if the container is in the refueling mode, the inlet flow sensor 114 may communicate a data message or signal to the thermal management controller 100, a controller for the motor, or to an electromagnetic clutch driven by the propulsion unit to activate (e.g., rotate the compressor shaft) the compressor 901.

An output of the compressor 901 is coupled to a condenser 902 via a high pressure line 908. In the condenser 902, the compressed refrigerant may condense to a liquid phase as it radiates heat. The condenser 902 is connected to an expansion valve 903 via a high pressure line 908. The expansion valve 903 forms a barrier between the high pressure side and the low pressure side of the heat pump 900. The high pressure side of the expansion valve 903 is coupled to the condenser 902, whereas, the low pressure side of the expansion valve 903 is coupled to the evaporator 904 via a low pressure line 907. In the evaporator 904, the refrigerant evaporates to a gas phase as it sinks or absorbs heat. The evaporator 904 is coupled to the compressor 901 via a low pressure line 907.

A cool temperature zone 905 is associated with the evaporator 904. A hot zone 906 or high temperature zone is associated with the condenser 902. The second heat exchanger 112 may be placed in the cool temperature zone 905 associated with the heat pump 900. For example, the second heat exchanger 112 may be placed adjacent to an evaporator 904 or in thermal communication with the evaporator coils (e.g., cooling coils) of the evaporator 904. If the evaporator 904 and the second heat exchanger 112 are positioned in such thermal communication, the heat pump 900 can facilitate increased sinking or absorption of heat through the second heat exchanger 112.

Any embodiment of the storage container associated with the thermal energy management system disclosed herein, including the embodiments of FIG. 5 through FIG. 9, may be used to reduce or minimize the fueling or refueling time to add hydrogen or other gaseous fuels to the storage container of a vehicle by efficiently dissipating thermal energy generated during refueling. The laws of thermodynamics (e.g., energy conservation) establish that the thermal energy inputted to the storage container from the propulsion unit to release hydrogen from the hydride during the dispensing mode (e.g., vehicle operational mode) is approximately equal to the thermal energy dissipated during the refueling process. However, the dispensing mode occurs over a much greater time than the refueling process, which leads to great amount of heat to be dissipated in a short time during the refueling process.

Having described various preferred embodiments, it will become apparent that various modifications can be made without departing from the scope of the invention as defined in the accompanying claims. For example, in one alternate embodiment, the input valve and the outlet valve may be replaced with a single valve that functions both as an inlet flow controller and an outlet flow controller.

The invention claimed is:
1. A container for storing hydrogen comprising:
    an outer shell having an inlet for inputting hydrogen gas and an outlet for outputting hydrogen gas;
    a thermally conductive liner lining an interior of the outer shell;
    an inner hydride core in communication with the inlet and the outlet for storing the hydrogen gas;
    coolant lines in thermal communication with at least one of the outer shell and the thermally conductive liner;
    an inlet flow sensor and an outlet flow sensor associated with the inlet and the outlet, respectively;
    a thermal management controller for determining whether the container is in a dispensing mode or a refueling mode based on a signal associated with at least one of the inlet flow sensor and the outlet flow sensor;
    a first heat exchanger in thermal communication with a propulsion unit of a vehicle;
    a second heat exchanger associated with a temperature that is less than or equal to the ambient temperature outside of the vehicle; and
    a valve assembly for routing the coolant lines in a dispensing mode to the first heat exchanger and for routing the coolant lines in refueling mode to the second heat exchanger.

2. The system according to claim 1 wherein the propulsion unit comprises an internal combustion engine associated with a coolant jacket and a first pump for circulating coolant; the coolant jacket coupled in series with the first heat exchanger.

3. The system according to claim 2 wherein the second heat exchanger is associated with a second pump for circulating coolant between the second heat exchanger and the coolant lines.

4. The system according to claim 3 wherein the second heat exchanger is in thermal communication with cooling coils or evaporator of a heat pump.

5. The system according to claim 1 wherein the propulsion unit comprises a fuel cell associated with a coolant chamber and a first pump for circulating coolant; the coolant chamber coupled in series with the first heat exchanger.

6. The system according to claim 5 wherein the second heat exchanger is associated with a second pump for circulating coolant between the second heat exchanger and the coolant lines.

7. The system according to claim 6 wherein the second heat exchanger is in thermal communication with cooling coils or evaporator of a heat pump.

8. The system according to claim 1 wherein the coolant lines are routed along an exterior of the outer shell.

9. The system according to claim 1 wherein at least part of the coolant lines are embedded in the thermally conductive liner.

10. The container according to claim 9 wherein the thermally conductive liner comprises a carbon foam core.

11. The container according to claim 1 wherein the thermally conductive liner comprises a carbon foam material with a series of fins interspersed with the inner hydride core to enhance thermal transfer of thermal energy between the hydride and the ambient environment around the container.

12. The container according to claim 1 wherein the container comprises a fuel tank of a hydrogen-powered vehicle selected from the group consisting of a fuel-cell vehicle and an internal combustion engine vehicle.

13. The container according to claim 1 wherein the outer shell comprises external fins for promoting heat dissipation from the container during recharging of the container.

14. The container according to claim 13 wherein the coolant lines are routed at least partially within channels formed by the external fins.

15. A method for storing hydrogen comprising:

providing an inlet for inputting hydrogen gas and an outlet for outputting hydrogen gas, a thermally conductive liner lining an interior of an outer shell, an inner hydride core in communication with the inlet and the outlet for storing the hydrogen gas, and coolant lines in thermal communication with at least one of the outer shell and the thermally conductive liner;

determining whether the container is in a dispensing mode or a refueling mode based on a signal associated with at least one of the inlet flow sensor and the outlet flow sensor associated with the inlet and the outlet, respectively;

routing the coolant lines to a first heat exchanger that is in thermal communication with a propulsion unit of a vehicle if the container is in the dispensing mode and routing the coolant lines to a second heat exchanger associated with a temperature that is less than or equal to the ambient temperature outside of the vehicle, if the container is in the refueling mode.

* * * * *